United States Patent [19]
Shuey et al.

[11] Patent Number: 5,578,118
[45] Date of Patent: Nov. 26, 1996

[54] NATURAL POLYPHENOLIC-CONTAINING VEGETABLE EXTRACT MODIFIED BITUMEN AND ANTI-STRIPPER COMPOSITIONS, METHOD OF MANUFACTURE AND USE

[75] Inventors: Mark W. Shuey, San Jose; Robert S. Custer, Whittier, both of Calif.

[73] Assignee: Saramco, Inc., Whitier, Calif.

[21] Appl. No.: 412,483

[22] Filed: Mar. 28, 1995

Related U.S. Application Data

[63] Continuation-in-part of Ser. No. 255,323, Jun. 7, 1994, Pat. No. 5,401,308.
[51] Int. Cl.$^6$ ............... C09D 193/00; C09D 195/00
[52] U.S. Cl. ............... 106/217.6; 106/273.1; 106/277; 106/284.4; 106/217.8; 427/138; 252/182.12; 560/69; 560/70
[58] Field of Search ............... 106/216, 273.1, 106/277, 284.4, 316, 505; 427/138; 252/182.12; 560/69, 70

[56] References Cited

U.S. PATENT DOCUMENTS

| | | | |
|---|---|---|---|
| 3,615,780 | 10/1971 | Kim et al. | 106/634 |
| 3,954,490 | 5/1976 | Cockram | 106/99 |
| 4,109,051 | 8/1978 | Cockram | 428/375 |
| 5,401,308 | 3/1995 | Shuey et al. | 106/273.1 |
| 5,407,476 | 4/1995 | Shuey et al. | 106/216 |

*Primary Examiner*—David Brunsman
*Attorney, Agent, or Firm*—Oblon, Spivak, McClelland, Maier & Neustadt P.C.

[57] ABSTRACT

The addition of from about 0.1 to about 1 parts by weight of a natural polyphenolic-containing vegetable extract (NPVE) per 100 parts of bitumens (particularly asphalt), coal tar, or other high boiling tars containing mixtures of aliphatic and aromatic hydrocarbons modifies the characteristics of the treated product to enhance its performance as hot-melt adhesives, coatings, sealants, roof-coatings, and road-coatings as compared to the base bitumen. The NPVEs are naturally occurring, are extracted from plants and include quebracho, chestnut, wattle and sumac. By forming the ammonia salt of NPVE (ammonium/NPVE) and adding it to a base or NPVE-modified bitumen, the characteristics of increased adhesion and resistance to stripping is observed. Surprisingly, the addition of commercially available anti-stripping agents to an ammonium/NPVE-modified bitumen results in a modified-bitumen having a stripping resistance greater than either of the additives alone. The ammonium/NPVE salt anti-stripping agent may be mixed directly with the tars or put into a water solution and then added to hot tars with the water being driven off. Alternately, the ammonium/NPVE salt anti-stripping agent may be applied to the aggregate to be mixed with the asphalt so as to produce a pretreated, anti-stripper coated aggregate.

25 Claims, 2 Drawing Sheets

NATURAL POLYPHENOLIC-CONTAINING VEGETABLE EXTRACT MODIFIED BITUMEN AND ANTI-STRIPPER COMPOSITIONS, METHOD OF MANUFACTURE AND USE

CROSS REFERENCE TO RELATED CASE

This application is a continuation-in-part application of U.S. application entitled QUEBRACHO-MODIFIED BITUMEN COMPOSITIONS, METHOD OF MANUFACTURE AND USE, Ser. No. 08/255,323, filed Jun. 7, 1994 now U.S. Pat. No. 5,401,308. This application is also related to an application entitled QUEBRACHO/SURFACTANT COMPOSITIONS AS UNIVERSAL BITUMEN/WATER EMULSIFIERS, Ser. No. 08/255,339 now U.S. Pat. No. 5,407,476, filed Jun. 7, 1994 by the same inventors, the disclosure of which is incorporated by reference if need be, and to the C-I-P/divisional application of the aforesaid related application entitled POLYPHENOLIC VEGETABLE EXTRACT/SURFACTANT COMPOSITIONS AS UNIVERSAL BITUMEN/WATER EMULSIFIERS, Ser. No. 08/412,381, filed Mar. 28, 1995 by the same inventors. These related applications relate to bitumen-in-water emulsions. Whereas in the parent application we disclosed quebracho-modified bitumens, this application is related to the use of natural polyphenolic-containing vegetable extracts, including quebracho, for use in modifying bitumens in place of quebracho, or in addition to the quebracho when these polyphenolic vegetable extracts are complexed with ammonia and used as an anti-stripping additive.

FIELD OF THE INVENTION

This invention relates to modified bitumen compositions having a viscosity modifier and an anti-stripping modifier added thereto and the method of making and using them. More particularly, this invention relates to polyphenolic-containing bitumen compositions having one or more polyphenolic-containing vegetable extracts treated with ammonia, amines and/or ammonia compounds as anti-strippants added thereto, the method of making polyphenolic-modified bitumen compositions containing polyphenolic/ammonia salt anti-stripping compounds, to form a modified bitumen composition having a viscosity higher than the base bitumen, as well as other enhanced chemical and physical attributes, including enhanced resistance to stripping, and a method of using the modified bitumen compositions, and the application of ammonia treated polyphenolic to aggregate prior to mixing with hot bitumen or to a substrate prior to laying down hot bitumen, to provide modified aggregates/substrates with greater resistance to stripping than the untreated aggregates/substrates,.

BACKGROUND OF THE INVENTION

Bitumens are naturally occurring or pyrolytically obtained substances of dark to black color consisting almost entirely of carbon and hydrogen with very little oxygen, nitrogen, and sulfur. Bitumens vary widely in hardness and volatility, ranging from crude oil to asphaltines.

Asphalt is a naturally occurring bitumen. It is also a petroleum byproduct, from which it is manufactured in commercial quantities by the removal of volatile components. Asphalt is composed of hydrocarbons and heterocyclic compounds having molecular weights varying from about 400 to above 5000. It is both thermoplastic and viscoelastic; i.e., at high temperatures or over long loading times it behaves as a viscous fluid, while at low temperatures or short loading times it behaves as an elastic body.

The three distinct types of asphalt made from petroleum residues are straight-run, air blown, and cracked. Straight run asphalt, characterized by a nearly viscous flow, is used in the construction of pavement surfaces for roads and airport runways. In this application, thermoplastic behavior is an undesirable characteristic in that the high temperatures experienced by roadway surfaces in a warmer climate or on hot days would result in excessive deformation of a thermoplastic asphalt when subjected to normal vehicle or aircraft loads. Ideally, the asphalt used in a pavement surface application would exhibit no flow, either viscous or thermoplastic, yet remain elastic. Airblown asphalt is resilient and has a viscosity that is less susceptible to temperature change than that of straight-run asphalt. It is used mainly for roofing, pipe coating, paints, underbody coatings, and paper laminates. This type of asphalt, while suitable for insulation and prophylactic applications, is not of sufficient hardness for pavement surfaces. Cracked asphalt, with limited applications such as dust laying or as an insulation board saturant, has a nearly viscous flow, but its viscosity is more susceptible to temperature change than straight-run asphalt.

Tannin or a tannin compound in combination with a surfactant and a heated bitumen to provide a bitumen-in-water emulsion have been described in the art. The published Kao Soap Company Japanese patent document by Ryooichi, et al., Japanese patent document 63-17960, reports a slow-setting, cationic, asphalt-in-water emulsion made from an emulsifying composition, including a surfactant, a tannin or tannic acid compound, calcium chloride and hydrochloric acid to adjust the pH. Quebracho is listed as one of the tannic acid compounds that can be used as a tannin compound. The emulsifying composition is combined with heated asphalt in the ratio of 40% w/w emulsifying agent to 60% w/w asphalt. However, attempts to reproduce the reported results of the Kao emulsion have been unsuccessful. The art is silent as to the mixing of quebracho with a bitumen to form a modified bitumen composition.

Quebracho is a natural product extracted from the heartwood of the Schinopsis trees that grow in Argentina and Paraguay. Quebracho is a well characterized polyphenolic and is readily extracted from the wood by hot water. Quebracho is currently widely used as a tanning agent. It is also used as a mineral dressing, as a dispersant in drilling muds, and in wood glues.

Quebracho is commercially available as a crude hot water extract, either in lump, ground, or spray-dried form, or as a bisulfite treated (refined) spray-dried product that is completely soluble in cold water. Quebracho is also available in a "bleached" form which can be used in applications where the dark color of unbleached quebracho is undesirable. The production of quebracho has been carried out for many years. Although quebracho is a natural product and has some variation in composition, it is a consistent source of the polyphenols that we have found are useful as a bitumen modifier for the modified bitumen compositions of this invention.

A road pavement's ability to support loads depends primarily upon the magnitude of the load, how often it is applied, the supporting power of the soil underneath, and the type and thickness of the pavement structure. Rigid pavements are constructed from concrete. Flexible pavements have less bending resistance than rigid pavements, and are typically composed of aggregate (sand, gravel, or crushed stone) and bituminous material as the top layer (approximately 2 inches), and an overlying seal coat. As noted above, the asphalt used in the construction of pavement surfaces preferably exhibits minimum thermoplastic flow, has a high viscosity (minimum viscous flow), and high hardness. Unmodified or base asphalt products currently available do not have this ideal set of characteristics.

Consequently, there is a long felt need for a bituminous or asphalt composition having higher viscosity, greater hardness and less thermoplasticity as compared to an unmodified or base asphalt, and particularly for a bitumen or asphalt composition suitable for use as a pavement layer in roadway or airport runway construction, as well as other applications where higher viscosity, low thermoplasticity and greater hardness are desired characteristics.

The strength of asphalt/concrete pavings will be adversely affected if moisture penetrates the asphalt-aggregate interface. The presence of water in the interface between the asphalt and the surface of the aggregate weakens the bond between the aggregate and the asphalt. Consequently, the asphalt is "stripped" away from the aggregate with resulting degradation of tensile strength of the asphalt/aggregate mixture.

Stripping is the breaking of the adhesive bond between the aggregate surface and the asphalt cement. Usually stripping begins at the bottom of the asphalt layer and moves upward until the pavement structure is weakened. Under traffic, cracks appear and, in advanced stages, the pavement begins to disintegrate; and, always, water is present. In one way or another the water gets between the asphalt film and the aggregate surface and, because the aggregate surface has a greater affinity for water than for asphalt, the adhesive bond is broken.

There is only one cause of stripping—water getting between an asphalt film and an aggregate surface and replacing the asphalt as the aggregate's coating. The water may reach the pavement structure is several ways. Among them are water in or on improperly dried aggregates; rainfall seeping through shoulders, cracks, or porous pavement, subsurface water from higher ground producing a hydrostatic head, capillary water from the subgrade, and water vapor from the subgrade. Once in place, the water may get to the aggregate in a number of different ways. The age and type of aggregate can affect the stripping resistance of the overlying asphalt. The age of the aggregate is important in that it is known that newly crushed aggregate has poor stripping resistance. If such an aggregate is used to soon after it is crushed, stripping may occur. Ostensibly the surface energy of the fresh aggregate surface is such that the surface has a much higher affinity for water than for asphalt.

The type of aggregate is known to affect the stripping resistance of asphalt to water. It is thought that aggregates with a high silica content, sometimes called "hydrophillic" (water loving), are apt to strip and that aggregates with low or no silica content, sometimes called "hydrophobic" (water hating), are not. Practically, however, few aggregates show complete resistance to the action of water under all conditions of use. As a rule, though, it is safer to use hydrophobic carbonate rock, such as limestone, if it is available. Regardless of the precautions taken, water will eventually find its way into the aggregate/asphalt mixture.

Anti-stripping additives are often used in the preparation of the asphalt concrete paving mixtures to improve the resistance of the paving mixtures to the action of water. Such anti-stripping agents may be certain amines that are added to the hot asphalt or they may be ground solids, such as hydrated lime or portland cement, that are mixed with the aggregate prior to mixing with the asphalt. The performance, or effectiveness, of an anti-stripping agent is determined by comparing the tensile strength of two sets of laboratory compacted pavement mixtures; one set kept dry and the other set saturated and water conditioned. The performance of the anti-stripping agent is expressed as a percentage of the tensile strength of the wet set as compared to the dry set (as described in the American Society for Testing Materials, test procedure D 4867-92).

The chemicals most often used as asphalt/coal tar anti-stripping agents are long chain organic compounds containing one or more amine moieties. In theory, the long organic chain, being soluble in asphalt, is anchored in the asphalt, whereas the positively charged amine nitrogen has an affinity for the aggregates. Since the asphalt is firmly attached to the long chain organic "tail" of the anti-stripping agent and the aggregate is firmly bonded to the amine "head" of the anti-stripping agent, the presence of water is less likely to cause the asphalt to strip from the aggregate.

Anti-stripping agents may be added directly to the asphalt or it may be premixed with the aggregate prior to mixing with asphalt. When an amine anti-stripping agent is added directly to the asphalt, only a small fraction of the agent is actually used. The time available for the amine to migrate through the asphalt and to the aggregate surface is limited; only a small portion reaches the aggregate before the asphalt cools and no further migration is possible.

Further, the anti-stripping agent must be thermally stable if it is to be mixed directly with the asphalt, since long delays (for example, due to rainy weather) may result in the asphalt being maintained at high temperature for several days. Consequently, to maintain thermal stability as an anti-stripper, any active amine hydrogens should be replaced with other, less active groups, otherwise the amine will lose its anti-stripping effectiveness if the asphalt is stored at high temperatures for any appreciable time.

For these reasons, it can be more efficient to apply the anti-stripping agent directly to the aggregate surface, as is done with hydrated lime or portland cement in a separate mixing step, prior to mixing with asphalt.

Currently, commercially available anti-stripping agents have a long chain organic molecule with one or more amine moieties making them difficult to work with. The long chain organic portion is characterized by relatively high molecular weights and diffuse charge distribution resulting in semi-solid or highly viscous materials that must be heated before they can be readily metered into hot asphalt.

Further, most of these anti-stripping agents are not water soluble. Consequently, prior to applying (e.g., spraying) the agent directly on the aggregate prior to mixing with asphalt, they must be dissolved in an organic solvent. However, the use of an organic solvent would result in undesirable organic emissions, potentially triggering an environmental permit requirement and/or hazardous materials and/or hazardous waste regulations. Further, any residual solvent presents the risk of inclusion or entrainment of an undesirable high boiling organic contaminant into the pavement mixture. Hence, the currently available organo-amine anti-stripping agents are not convenient in their use and do not exhibit those attributes that are desirable in a universal anti-stripping additive.

Accordingly, there is a long felt need for an anti-stripping additive that may be applied either directly to the aggregate as an aqueous solution, or mixed directly with the asphalt, that is thermally stable, that does not risk contamination of the asphalt with a high boiling solvent, and is innocuous in its use and disposal.

THE INVENTION

OBJECTS

It is among the objects of this invention to provide an anti-stripping additive derived from natural polyphenolic-containing vegetable extracts (NPVE) that are thermally stable and are water soluble for incorporation in an asphalt/aggregate mixture.

It is another object of this invention to provide a method of making anti-stripping additives derived from NPVEs that can be used in making modified bitumen compositions having improved anti-stripping characteristics as compared to base or unmodified bitumen.

Yet another object of this invention to provide methods of using anti-stripping additives to modify the surface of the associated aggregate/substrate to produce a modified aggregate/substrate having improved anti-stripping characteristics as compared to unmodified aggregate/substrates.

It is a further object of this invention to provide a modified bitumen composition having a higher viscosity, lower thermoplasticity, greater hardness and improved anti-stripping characteristics than unmodified bitumen and which overcomes the limitations of the existing art.

It is another object of this invention to provide a method of use of the modified bitumen composition of this invention.

It is yet another object of this invention to provide a process of making a modified bitumen composition having a higher viscosity, greater hardness, improved thermoplastic and anti-stripping characteristics as compared to base or unmodified bitumen.

Yet another object of this invention is to provide a method of using a polyphenolic containing vegetable extracts to modify bitumens, coal tars, and other high boiling tars to provide a modified bitumen composition having characteristics that will make the bitumen better suited for use as hot-melt adhesives, coatings, sealants, roofing, and road-coatings.

Still other objects, features, aspects and advantages of the present invention will become apparent from the following Summary, Detailed Description and claims of the present invention, when taken in conjunction with the accompanying drawing.

SUMMARY

Bituminous materials (such as asphalt and gilsonite), coal tar, tar sands, oil shale and high boiling hydrocarbon fractions from petroleum distillation are widely used to manufacture hot-melt adhesives, coatings, sealants, roof-coatings, and road-coatings. At ambient temperatures, these bitumens are typically solids or highly viscous, semisolid liquids. To obtain a low viscosity liquid for easy application, these bitumens are either cut with an organic solvent such as napthalene or kerosene, heated to reduce the viscosity, or emulsified with water using emulsifiers and mechanical shearing. By far the largest use of these bitumous materials is in the preparation of road paving mixtures typically containing 90% to 95% by weight of graded aggregate and 10% to 5% by weight asphalt. The mixed aggregate and asphalt are applied hot on a prepared road bed and then compacted to eliminate air voids and to achieve intimate contact between the asphalt and the rock aggregate.

We have discovered that natural polyphenolic containing vegetable extracts (NPVEs), particularly quebracho, are an excellent modifier of bitumens, coal tars, and other high boiling mixtures of aliphatic and aromatic hydrocarbons. When these NPVEs are combined with bituminous compounds at the rate of about 0.1%–25% w/w of bitumen, the resulting NPVE-modified bitumen compositions, when used as hot-melt adhesives, coatings, sealants, roof-coatings and road-coatings, unexpectedly exhibit greater adhesion to substrates, greater resistance to abrasion, higher softening points, lower penetration numbers (i.e., greater hardness), and higher viscosity than unmodified bitumens. Quebracho as a natural product is a well characterized and consistent source of the polyphenolic component used in the modified bitumen compositions of this invention.

The quebracho used may be any of its normally available commercial forms. The quebracho may be introduced to a heated base bitumen as a dry, powdered or granular compound. The crude lump quebracho should be ground to a fine particle size to permit it to be easily incorporated into the hot bitumen. In ground form quebracho is typically a reddish brown or maroon-colored powder. Alternately, unground lump quebracho may be added directly to hot asphalt. Since all of the common grades of quebracho contain water (crude lump typically contains 18–20% water, crude spray-dried typically contains 5–6% water, and spray-dried refined typically contains 5–8% water), the contained moisture in the quebracho will be driven off by the hot asphalt, creating a mechanical agitation or turbulence that will assist in the break up of the lumps and facilitate dispersion of the quebracho throughout the hot asphalt. The lump material can sink to the bottom, however, and in that case it is necessary to provide some additional agitation to break up the lumps and disperse all of the quebracho into the hot asphalt.

Alternately, the quebracho may be predissolved in water or a hydrocarbon solvent prior to addition to the heated base bitumen. Crude quebracho is not fully soluble in cold water unless the water is adjusted to a pH above about 8.5. However, the crude material will dissolve slowly at water temperatures above about 120° F. The refined spray-dried quebracho results from treatment of the crude quebracho with sodium bisulfite and is fully soluble in cold water, creating an acidic solution. Upon addition of the quebracho solution to the hot bitumen, followed by mixing, the solvent is driven off leaving the quebracho in intimate admixture with the heated bitumen. The ultimate performance of the modified bitumen as used in any particular application will depend upon the physical characteristics of the bitumen. Fillers, extenders, anti-strippants and other modifiers may be added to enhance the performance of the modified bitumen to make it better suited for a particular application. For instance, rubbers, fillers, and polymers may be added to the modified asphalt to make it ideally suited for use as a pavement. In addition, the modified asphalt may be either heated, cut with a solvent, or emulsified in water so as to reduce its viscosity thus facilitating its use.

We have discovered that certain NPVEs, including wattle (mimosa), refined quebracho, unrefined quebracho, chestnut A, chestnut N and sumac, when mixed with ammonia, amines or other ammonia containing compounds, react to produce ammonia/NPVE salts which make excellent anti-stripping additives for bitumens, coal tars, and other high boiling mixtures of aliphatic and aromatic hydrocarbons.

Surprisingly, we have discovered that there is a synergistic improvement in stripping resistance when an NPVE, treated with ammonia to form the salt, is used in combination with one of the existing commercially available organo-polyamine anti-stripping agents such as Pavebond Special (Morton International, Inc.), Redicote E (Akso Chemicals, Inc), Acra-500 (Tomah Products, Inc.) and Jetco-AD (Jetco Chemicals, Inc). This is unexpected for two reasons.

First, it is well known that stripping resistance may actually be reduced if too much anti-stripping additive is used. Theoretically, when sufficiently high pavement temperatures allow the dissolved adhesion-promoting anti-stripping agent to continue to migrate to the asphalt/aggregate interface, the concentration dissolved in the asphalt at the asphalt/aggregate interface is in excess of what is needed to satisfy all of the aggregate's adsorption sites. Consequently, hydrocarbon to hydrocarbon interfacial orientation can occur, creating a mechanically weak, water susceptible, shear plane.

Second, the synergistic result is unexpected since all currently commercially available anti-stripping additives are organo-amines or silicones. In contrast, the anti-stripping additives of this invention are composed of polyphenolic-containing vegetable extracts mixed with an ammonia compound in water to produce an ammonia/polyphenolic salt solution, and/or solid polyphenolics mixed with amines or other ammonium compounds to produce solid ammonia/polyphenolic salts.

The anti-stripping additives described herein can be readily incorporated into bitumen mixtures (or other high boiling aliphatic or aromatic hydrocarbons) or coatings in any of four ways:

(1) By introducing an ammonia/amine/ammonia-containing compound into an existing NPVE-modified bitumen (e.g., a quebracho modified bitumen) such that from about 0.1% to about 2%, and preferrably 0.5%, of the NPVE is converted to an ammonia/NPVE salt in situ;

(2) By making a water solution of the NPVE in a concentration range of from about 5% to about 45% and adding at least a stoichiometric amount of an ammonia/amine/ammonia-containing compound to form the salt and have a final solution pH between about 7.5 and 10, and adding the water solution directly to the hot bitumen (either base bitumen or previously NPVE-modified) with the water evaporating out of the mixture, thus leaving the anti-stripping additive dispersed in the bitumen;

(3) By applying a neat amine or an ammonia-water solution directly onto the granular NPVE to form the solid salt and then mixing these (moist) solids directly into the hot bitumen (either base or previously NPVE-modified) with any water evaporating out of the bitumen; or (4) By applying a water solution of the ammonium/NPVE salt anti-stripper to the aggregate or substrate where it will adhere to the surface after evaporation of the water solvent as a coating.

Currently, commercially available organo-amine anti-stripping additives are typically added as an organic liquid directly to the bitumen followed by sufficient mixing. Lime and portland cement are typically added as anti-stripping additives to pre-wetted aggregate, which is then dried and fed to the hot mix asphalt plant to produce pavement mixtures. By comparison, the ammonium/NPVE salt anti-stripping additives of this invention are extremely flexible as to the form and process by which they may be incorporated into the asphalt. As outlined above, our anti-stripping additives may be formed in situ in a previously NPVE-modified bitumen, by either direct addition to the asphalt as a water solution or as a moist solid to either a base or previously NPVE-modified bitumen, or it may be applied directly as a water solution to the aggregate prior to mixing with the hot bitumen.

Asphalt producers are accustomed to incorporating aqueous additives into their asphalt products since elastomers and rubber compounds are typically supplied to asphalt producers in water emulsions. Consequently, asphalt producers will find incorporation of the of the aqueous anti-stripping additive into hot asphalt to be a familiar process.

It is important that anti-stripping additives be thermally stable, particularly if they are to be added directly to the hot asphalt. It is not uncommon for a contractor to have to hold molten asphalt for 2 to 3 days pending good weather conditions. Unless the anti-stripping additive is thermally stable, it may deteriorate, resulting in a substantial decrease in its effectiveness as an anti-stripping additive. We have discovered that the ammonium/NPVE salt anti-stripping additives of this invention exhibit good thermal stability even when kept at molten asphalt conditions for several days.

We have also discovered that the modified bitumen of this invention is ideally suited as a feedstock for making a bitumen-in-water emulsion. The modified bitumen of this invention is heated and then combined with an aqueous surfactant solution in the ratio of about 40% by weight aqueous surfactant solution to about 60% by weight of modified bitumen. The resulting emulsion is a slow-setting emulsion having a net negative charge (i.e., an anionic emulsion) and has the unexpected properties of higher viscosity, enhanced stability and decreased drying times. It is universal in that it can be used as such or with from 1–3 lbs. filler/lb of emulsion, or it has a high ionic overhead.

The following are terms, their abbreviations and intended meanings used in describing the compositions and methods of this invention:

NPVE refers to the natural wood and bark extracts of several trees of various genera that are high in polyphenolic-containing extracts, including as principal components, tannin and related compounds namely: Chestnut A and Chestnut N from the genus Catanea and other genera of the order of which it is a member; Sumac-K10 Hrhus coriara, and Quebracho (defined below). The Chestnut is in the order Fugales, other well known members of which include, beside the genus Castanea (Chestnut), the genus Betula (birch), Fagus (beech) and Quercus (oak). The genus Castanea is native to the northern hemisphere and includes: the American Chestnut, *C. dentata;* the European (Italian) Chestnut, *C. Sativa;* the Chinese Chestnut, *C. molissima,* and the Japanese Chestnut, *C. crenata.*

Quebracho refers to the wood and bark extract of any number of South American trees of different genera of the order Sapindales. The main components are aspidospermine, tannin, tannic acid, and quebrachine. The two principle grades of quebracho include crude quebracho, and bisulfite-treated or refined quebracho.

Bitumen refers to any thermoplastic, naturally occurring or pyrolytically obtained substance having a dark to black color consisting almost entirely of carbon and hydrogen, with some nitrogen, sulfur, and oxygen. The term is intended to include heavy oils, tars, pitch, asphalt, and asphaltites.

Asphalt refers to any of the varieties of naturally occurring and petroleum-derived bitumens of varying molecular weights from about 400 to above 5000, and composed of hydrocarbons and heterocyclics containing nitrogen, sulfur, and oxygen.

Natural Polyphenolic Vegetable Extract (NPVE) for the purposes of this invention refers to any of the natural vegetable extracts containing polyphenolic compounds, and in particular, quebracho, chestnut A, chestnut N, sumac and wattle.

NPVE-Modified Bitumen refers to a bitumen containing up to 25% by weight of a natural polyphenolic vegetable extract.

Ammonium/NPVE Salt Anti-Strippant for the purposes of this invention is equivalent to the phrase "ammonium/polyphenolic complex or salt anti-stripping additive" and refers to the ammonium/polyphenolic complex formed from the addition of ammonia, amines or ammonia containing compounds to the NPVEs of this invention.

DRAWINGS

The invention is illustrated by reference to the drawings, in which:

FIG. 1 shows the process flow diagram for the method of making the NPVE-modified asphalt and ammonium/NPVE anti-strippants of this invention; and FIG. 2 is a cross-section diagram of the construction of a typical pavement using NPVE-modified bitumen of this invention.

DETAILED DESCRIPTION OF THE BEST MODE

The following detailed description illustrates the invention by way of example, not by way of limitation of the principles of the invention. This description will clearly enable one skilled in the art to make and use the invention, and describes several embodiments, adaptations, variations, alternatives and uses of the invention, including what we presently believe is the best mode of carrying out the invention.

Quebracho suitable for addition to bitumens (hereafter tar, tars, or asphalt) is commercially available as crude water extract in lump, ground, or spray-dried form and as bisulfite-treated (refined) extract in spray-dried granular form. There is also a somewhat lighter colored "bleached" quebracho available as a spray-dried granular material. While any of these forms may be used, the lump form or spray dried forms are preferred for addition of quebracho to the bitumen or molten tars as these are already dark in color and less expensive than the refined extract. However, the refined extract, or bleached form, is appropriate for use in those applications where the dark color of unbleached quebracho is undesirable.

Refined quebracho is obtained by treating the crude water extract with sodium bisulfite to obtain a quebracho product that is soluble in cold water. However, water solubility is not an issue where the quebracho is directly added to molten tars, and one of the crude, powdered forms is preferred for the direct addition method because of the lower cost even though more mixing and mechanical agitation is generally required.

Figure 1:
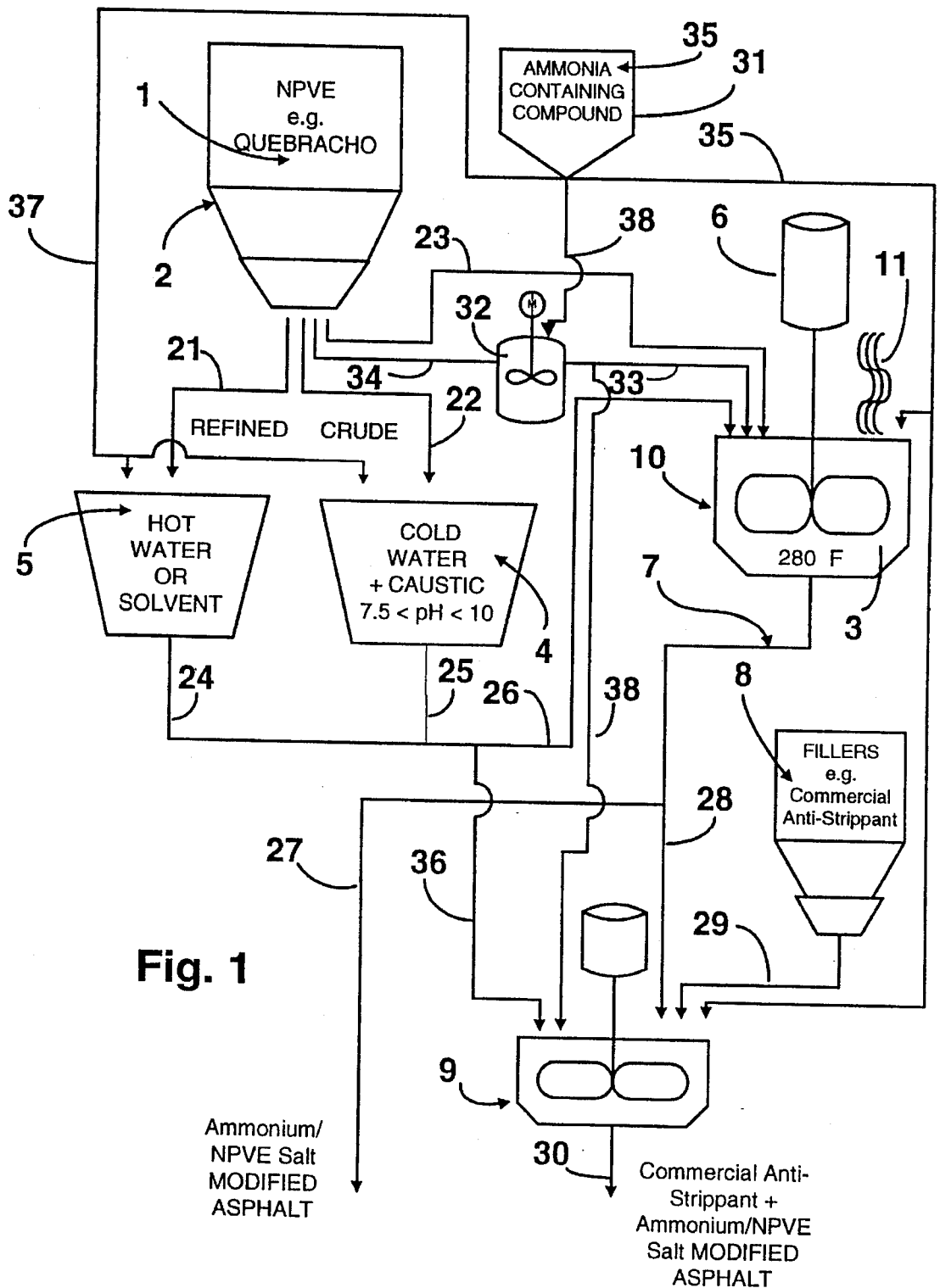

FIG. 1 shows the process flow of the method of making the modified asphalt product. A natural polyphenolic vegetable extract ("NPVE"), for example quebracho, feedstock 1 is typically provided from a feed hopper 2 or other container. The quebracho, or other NPVE, may be either a crude extract, as delivered through line 22, or the refined extract 21. The NPVE may preferably be added as a dry powder or granule directly to the asphalt mixture 3 via line 23 in the portions of at least 0.1 parts dry weight to 100 parts by weight asphalt and up to about 25 parts by weight. An alternate preferred method is to either dissolve the crude NPVE 22 in: a) hot water 4 (at least 60° C.), or b) in a cold aqueous caustic solution 4 having a pH of from about 7.5 to about 10 and then deliver the NPVE aqueous solution to the hot asphalt 3 via lines 25 and 26. Alternately, the refined NPVE, for example refined, bisulfite treated quebracho, 21 may be dissolved in hot water or a hydrocarbon solvent 5 and then subsequently added to the asphalt 3 via lines 24 and 26. At least 0.1 parts dry weight quebracho to 100 parts by weight asphalt is needed for both alternate preferred methods.

Upon addition of the quebracho 1 compound to the asphalt 3, there should be sufficient agitation or mechanical mixing to ensure that the quebracho is evenly mixed throughout the hot asphalt 3. As mentioned above, a preferred method is to add quebracho 1 to the hot asphalt 3 as a predissolved solution in water or in a hydrocarbon solvent to minimize agitation. On the other hand, if quebracho is added in crude form (clourse granules or lumps) significant agitation will be required. The quebracho solution is delivered via line 26 to the hot asphalt 3 and is thoroughly mixed with the hot asphalt 3 using a mixing or agitation means 6. The temperature of the asphalt is sufficiently high, preferably about 280° F., that mixing is nearly immediate.

The organic solvent or water introduced with the quebracho is driven off as vapor 11 by the high temperatures of the molten asphalt 3. The crude lump material contains as much as 18–20% w/w moisture whereas the spray-dried products contain about 5–7% w/w moisture. In either case, this intrinsic moisture will also be driven off 11 by the high temperatures of the molten asphalt. Due care is needed to prevent injury or loss because of the potential for vigorous evolution of this moisture from the hot asphalt.

After complete mixing, the modified asphalt 7 is drawn from the hot asphalt mixing tank 10. The NPVE-modified asphalt may be drawn through line 27 and used as-is, or it may be further processed in filler tank 9 via line 28. Fillers such as oxidants, antioxidants, anti-strippers, rubbers, and mineral fillers may be added via line 29 from the filler hopper 8, if desired, to impart those qualities associated with the particular filler used, for example better aging characteristics, or improved stripping resistance, to the NPVE-modified asphalt. A separate mixing tank 9 may be used to mix in the fillers or, alternately, the fillers may be added to the asphalt mixing tank 10.

The addition of an NPVE, such as quebracho, to asphalt to produce the NPVE-modified asphalt of this invention has produced unexpected results, including an increase in the softening point, increased viscosity and a decrease in the penetration number (harder).

The introduction of the ammonium/NPVE salt anti-stripping additve to a base or NPVE-modified bitumen, e.g. quebracho-modified bitumen, will significantly increase the stripping resistance of the asphalt and can be done in a number of ways.

In a preferred method, NPVE from the feedhoppr 1 in FIG. 1 is conveyed to mixing vessel 32 via line 34. An ammonia containing compound is conveyed from feed hopper 31 in at least an amount to completely complex the NPVE to produce an ammonia/NPVE complex or salt as a moist solid. The ammonia/NPVE complex is conveyed via line 33 to the asphalt mixing tank 10 or alternately to the filler mixing tank 9 via line 38 wherein the ammonia/NPVE complex is added to the hot asphalt in an amount of at least 0.1%.

In an alternate preferred method, the ammonia containing compound is introduced into either mixing tank 5 or mixing tank 4 via line 37 in an amount sufficient to convert just enough of the dissolved NPVE contained therein such that the final concentration of the ammonia/NPVE complex in the hot asphalt of mixing tank 10 is at least 0.1%. Alternately, mixing tanks 5 and 6 may be used to make bulk solutions of the ammonium/NPVP anti-stripping agent, in which case the ammonium/NPVE complex can be delivered directly to either mixing tank 10 or mixing tank 9. Should an NPVE-modified asphalt be desired in this case, the NPVE must be introduce as a solid via line 23.

In a third preferred method, the ammonia containing compound is added directly to the NPVE-modified hot asphalt while it is either in mixing tank 10 or in filler mixing tank 9 via line 35 to form the ammonium/NPVE salt anti-strippant in situ. The amount added to the previously NPVE-modified asphalt is such that at least 0.1% of the NPVE contained in the asphalt is complexed with the ammonia from the ammonia containing compound.

A commercially available organo-amine anti-stripping agent may be added as a filler from hopper 8 into the hot asphalt in filler mixing tank 9. The ammonium/NPVE anti-stripping agent may already be in the hot asphalt, or alternately, it may be later introduced via line 38 or 36.

Figure 2:
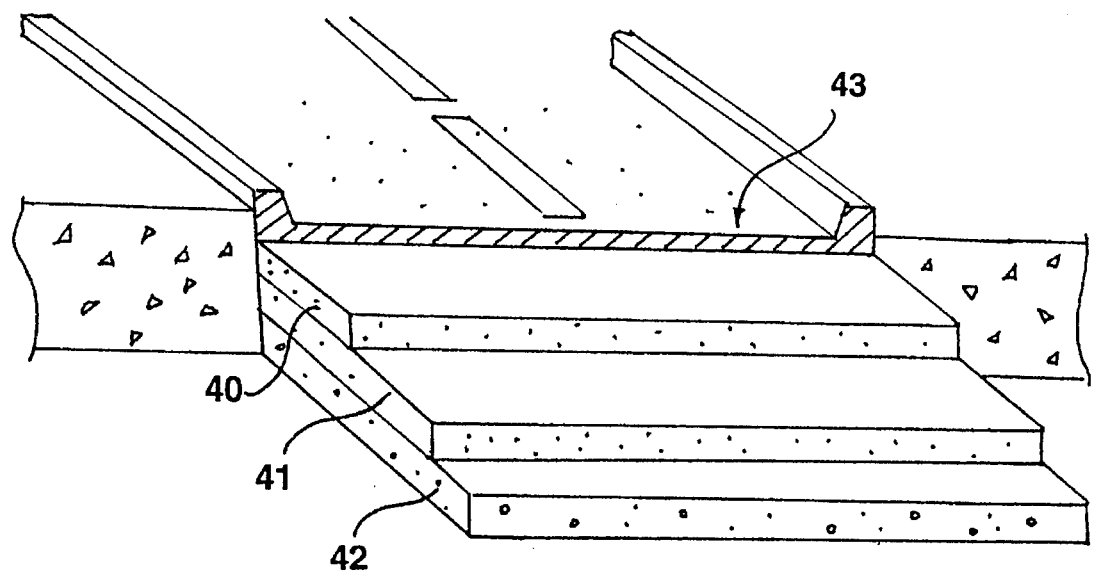

FIG. 2 shows the typical construction of a roadway pavement. A two inch layer of bituminous material 40 is poured onto a three inch gravel base 41 which in turn sits on top of a five inch sand and gravel sub-base 42. A light bituminous overcoat 43 is applied to seal the two inch bituminous layer 40. In a fourth preferred method of this invention, an aqueous solution of the ammonia/NPVE complex is sprayed on the substrate 41 to produce an ammonium/NPVE salt anti-strippant pretreated sunstrate.

The characteristics of the modified asphalt of this invention make it better suited for pavement construction than base or unmodified asphalt. The increased hardness and higher viscosity result in a pavement surface that is less prone to flow under heat and pressure and more resistant to impacts. The practice of this invention may clearly be seen in the following examples:

EXAMPLE 1

Characterization of Modified Asphalt By Varying The Amount of Quebracho

Asphalt was modified in a series of four blends by the addition of increasing amounts of quebracho: a 1% blend containing 5 gms of quebracho mixed with 495 gms of asphalt, a 2.0% blend contained 10 gms of quebracho mixed with 490 gms of asphalt, a 4.0% blend contained 20 gms of quebracho mixed with 480 gms of asphalt and an 8.0% blend contained 40 gms of quebracho mixed with 460 gms of asphalt. Note that a lower Penetration Number means the material is harder. The results are shown in Table I.

TABLE I

Asphalt/Quebracho Blend Properties

| % Quebracho In Modified Asphalt | Asphalt Hardness- Penetration Number (dmm) | Viscosity 140° F. Poises | Softening Point °F. |
|---|---|---|---|
| 0.0% | 60 | 1726.6 | 114 |
| 1.0% | 58 | 2210.0 | 118 |
| 2.0% | 56 | 2220.8 | 119 |
| 4.0% | 52 | 2393.6 | 120 |
| 8.0% | 47 | 2721.6 | 122 |

Note:
The Penetration test is ASTM D5; the Viscosity test is ASTM D4957; and the Softening Point, is Ring and Ball, ASTM D 36.

This example shows the unexpected results obtained by modifying asphalt by the addition of quebracho. Hardness, as measured by penetration, appears to increase linearly with the percentage of quebracho, at least for the range of quebracho investigated. Surprisingly, the viscosity of the asphalt increases suddenly with just a 1% introduction of quebracho. Thereafter, the viscosity increases only slightly with 2% quebracho, but increases rapidly above 2% quebracho. The softening point, like the viscosity, appears to increase rapidly with low amounts of quebracho. However, as the percentage of quebracho increases, the softening point data suggests asymptotic behavior.

The results of Example 1 show that asphalt may be modified by the introduction of quebracho to impart the characteristics of increased hardness, increased viscosity, and a higher softening point. These characteristics make the modified asphalt composition of this invention better suited for those applications requiring these attributes, such as pavement for roadways and airport landing strips.

EXAMPLE 2

Treatment of Asphalt to Enhance Anti-Stripping Characteristics Using Polyphenolic Vegetable Extracts Mixed with Ammonia A series of asphalt pavement mix samples were prepared using an AR-4000 asphalt in a hot mixed asphalt with 12.5 mm nominal surface course (maximum aggregate size was ½ inch). The same limestone aggregate was used for all tests. Various quantities of polyphenolic anti-strippers were added to the asphalt prior to mixing with the aggregate. The anti-strippers were prepared by dissolving the particular extract in water and adding ammonia until the indicated pH in the range of approximately 8.5–9.5 was reached (see Table II below). The anti-stripper concentrations were approximately 20% in the water solution. The solutions were then mixed into the hot asphalt with the water boiled off. Little or no ammonia odor was noted in the exiting vapors. The asphalt containing the anti-stripper was held at 290° F. for 4 hours prior to mixing with the aggregate to form the hot mix.

The hot mix was used to prepare test specimens for testing in accordance with the American Society for Testing and Materials Test, D 4867-92, Standard Test Method for Effect of Moisture on Asphalt Concrete Paving Mixtures. Under this test procedure, the degree of susceptibility to moisture damage is determined by preparing two sets of laboratory compacted specimens. The specimens are compacted to a void content of 7%±1%. The specimens were divided into two subsets. The first subset was maintained dry while the second subset was partially saturated with water and moisture conditioned (MC). The tensile strength of each subset is determined by the tensile splitting test. The potential for moisture damage is indicated by the ratio of the mean tensile strength of the wet subset to that of the dry subset. For the results shown in Table II below, two wet and two dry specimens were prepared in each case. The results are reported as the percent Tensile Strength Ratio (TSR) of the wet specimens to the dry specimens. A typical performance requirement established by a specifying agency is 75%.

TABLE II

| EXTRACT USED | pH OF WATER | TENSILE STRENGTH (PSI) | | |
|---|---|---|---|---|
| (% W/W IN ASPHALT) | SOLUTION USED | MEAN DRY | MEAN MC | TSR (%) |
| CONTROL (NO ADDITIVE) | — | 108.84 | 63.06 | 57.94 |
| CHESTNUT A (@ 0.5%) | 9.45 | 104.92 | 68.22 | 65.02 |
| CHESTNUT N (@ 0.5%) | 9.24 | 104.59 | 68.22 | 70.93 |
| SUMAC (@ 0.5%) | 9.43 | 99.26 | 50.73 | 51.11 |
| WATTLE (@ 0.5%) | 9.35 | 95.19 | 72.72 | 76.39 |
| QUEBRACHO (REFINED @ 0.5%) | 9.61 | 109.37 | 69.93 | 63.94 |
| QUEBRACHO (UNREFINED @ 0.5%) | 8.50 | 111.48 | 77.23 | 69.37 |

The above results clearly show that the stripping resistance of asphalt can be improved with the introduction of only 0.5% w/w of polyphenolic extract in an ammonia solution.

EXAMPLE 3

Treatment of Asphalt with Commercial Anti-Stripping Agent vs Treatment in Combination with Unrefined Quebracho Mixed with Ammonia In this example, the asphalt was treated with a commercial polyamine anti-stripping additive, Pavebond Special, a product of Morton International, at two different concentration levels: 0.25% and 0.50% by weight of the asphalt. In each case, the Pavebond, a liquid, was mixed directly into the molten asphalt. This was compared to the results to a third sample prepared by adding unrefined quebracho (mixed with ammonia) to 0.50% of the weight of asphalt. Finally, a fourth sample was prepared in which Pavebond Special was added at 0.25% together with unrefined quebracho at 0.25%. In this fourth sample, the Pavebond Special was first mixed directly into the asphalt and the aqueous quebracho-ammonia solution was added subsequently into the Pavebond treated asphalt. The results are presented in Table III.

TABLE III

| ANTI-STRIPPANT | pH OF WATER | TENSILE STRENGTH (PSI) | | |
|---|---|---|---|---|
| (% W/W IN ASPHALT) | SOLUTION USED | MEAN DRY | MEAN MC | TSR (%) |
| PAVEBOND SPECIAL (@ 0.25%) | — | 119.50 | 94.42 | 79.01 |
| PAVEBOND SPECIAL (@ 0.5%) | — | 102.13 | 86.56 | 84.75 |
| QUEBRACHO (UNREFINED @ 0.50%) | 8.50 | 111.48 | 77.33 | 69.37 |
| PAVEBOND SPECIAL (@ 0.25%) + QUEBRACHO (UNREFINED @ 0.25%) | 8.50 | 107.62 | 96.54 | 89.70 |

Surprisingly, the above tests show that the unrefined quebracho polyphenolic extract, when combined with the commercial polyamine product, Pavebond, produces a higher TSR than either Pavebond or quebracho by itself, thereby demonstrating a synergistic improvement.

EXAMPLE 4

Treatment of Asphalt with Wattle Extract Showing Thermal Stability

In the method of Example 1 above asphalt was treated with a wattle-ammonia solution at the level of 0.50% wattle vs the weight of asphalt. A second sample was prepared containing the same amount of wattle. The treated asphalt of the second sample was held at a temperature of 270° F. for three days (72 hours) before being mixed with aggregate. The first sample was held for only the standard four hour period prior to mixing with aggregate. Table IV shows the results of the tensile strength tests performed on the two asphalt/aggregate samples.

TABLE IV

| EXTRACT USED | pH OF WATER | TENSILE STRENGTH (PSI) | | |
|---|---|---|---|---|
| (% W/W IN ASPHALT) | SOLUTION USED | MEAN DRY | MEAN MC | TSR (%) |
| WATTLE (@ 0.5%) | 9.35 | 95.19 | 72.72 | 76.39 |
| WATTLE (AGED 72 HOURS) (@ 0.5%) | 9.00 | 95.27 | 68.05 | 71.43 |

The above results show that this anti-stripping agent exhibits good thermal stability, losing only a small portion of its effectiveness when stored at an elevated temperature for an abnormally long period of time.

It should be understood that various modifications and alternatives within the scope of this invention can be made by one of ordinary skill in the art without departing from the spirit thereof. We therefore wish our invention to be defined by the scope of the appended claims as broadly as the prior art will permit, and in view of the specification if need be.

We claim:

1. An ammonium/polyphenolic anti-stripping agent for bitumens, comprising:
   a) an acidic natural polyphenolic-containing vegetable extract, said natural polyphenolic-containing vegetable extract is at least one of the polyphenolic vegetable extracts selected from the group consisting essentially of: quebracho, wattle, chestnut A, chestnut N, and sumac;
   b) an ammonia-containing compound which, upon at least stoichiometric addition to said natural polyphenolic-containing vegetable extract, reacts with said acidic polyphenolic vegetable extract to produce an ammonium/natural polyphenolic-containing vegetable extract salt anti-stripping agent, said anti-stripping agent being thermally stable and soluble in water.

2. An ammonium/polyphenolic anti-stripping agent for bitumens as in claim 1, wherein:
   a) said ammonia containing compound is at least one of the amine containing compounds selected from the group consisting essentially of: ammonia, primary amines, secondary amines, tertiary amines and ammonium compounds.

3. A modified bitumen composition, comprising:
   a) a first quantity of from 0% to about 25% by dry weight natural polyphenolic-containing vegetable extract, said natural polyphenolic vegetable extract is at least one of the polyphenolic vegetable extracts selected from the group consisting essentially: quebracho, wattle, chestnut A, chestnut N, and sumac;
   b) 100% to about 75% by weight bitumen, said first quantity of natural polyphenolic-containing vegetable extract is intimately dispersed in said bitumen to produce a continuous phase of natural polyphenolic-containing vegetable extract modified bitumen having increased softening temperatures, increased hardness, and increased viscosity;
   c) from about 0.1 percent to about 2% by dry weight ammonium/natural polyphenolic-containing vegetable extract (ammonium/natural polyphenolic-containing vegetable extract) salt anti-stripping agent, said ammonium natural polyphenolic-containing vegetable extract salt anti-stripping agent comprising:
      i) a second quantity of natural polyphenolic-containing vegetable extract, said natural polyphenolic vegetable extract is at least one of the polyphenolic vegetable extracts selected from the group consisting essentially of: quebracho, wattle, chestnut A, chestnut N, and sumac;
      ii) an ammonia containing compound which, upon at least stoichiometric addition to said natural polyphenolic-containing vegetable extract, reacts with natural polyphenolic-containing vegetable extract to provide an ammonium/natural polyphenolic-containing vegetable extract salt anti-stripping agent, anti-stripping agent being thermally stable and soluble in water; and
   d) said ammonium/natural polyphenolic-containing vegetable extract salt anti-stripping agent is intimately dispersed in said bitumen to provide a continuous phase of ammonium/natural polyphenolic-containing vegetable extract anti-stripping agent in said natural polyphenolic-containing vegetable extract modified bitumen having enhanced stripping resistance and increased adhesion to aggregates and substrates.

4. A modified bitumen composition as in claim 3, further comprising a commercially available anti-stripping agent in an amount in the range from about 0% by weight to about 2% by weight of bitumen, the combination of said commercially available anti-stripping agent in cooperation with said ammonium/natural polyphenolic-containing vegetable extract salt anti-stripping agent providing to the bitumen a stripping resistance greater than the stripping resistance provided by either said commercially available anti-stripping agent or said polyphenolic anti-stripping agent alone.

5. A modified bitumen composition as in claim 3, wherein:
   a) said ammonia containing compound is at least one of the ammonia containing compounds selected from the group consisting essentially of: ammonia, primary amines, secondary amines, tertiary amines and ammonium compounds.

6. A modified bitumen composition as in claim 3 wherein said quebracho is selected from the group consisting essentially of crude lump quebracho, crude spray-dried quebracho, sodium bisulfite-treated spray-dried quebracho, bleached spray-dried quebracho and mixtures thereof.

7. A modified bitumen composition as in claim 3 wherein said bitumen is asphalt.

8. A modified bitumen composition as in claim 7 wherein:
   a) said anti-stripping agent is present in an amount of from about 0.1% by weight to 2% by weight in said asphalt.

9. A method of making a modified bitumen composition comprising in operative order the steps of:
   a) heating a bitumen to above about its softening point to lower its viscosity to permit mechanical mixing and agitation of the bitumen;
   b) adding a natural polyphenolic-containing vegetable extract to said bitumen at the rate of from about 0 parts by dry weight to 25 parts by dry weight or more per 100 parts by weight of said bitumen;
   c) adding natural polyphenolic-containing vegetable extract to at least a stoichiometric amount of an ammonia containing compound to produce an ammonium/natural polyphenolic-containing vegetable extract salt anti-stripping agent;
   d) reacting said natural polyphenolic-containing vegetable extract to said ammonia containing compound to produce an ammonium/natural polyphenolic-containing vegetable extract salt anti-stripping agent;
   e) adding said ammonium/natural polyphenolic-containing vegetable extract salt anti-stripping agent to said bitumen at the rate of 0.1 parts by weight to about 2 parts by weight or more per 100 parts by weight of said bitumen; and
   f) mixing said ammonium/natural polyphenolic-containing vegetable extract salt anti-stripping agent with said bitumen to distribute said amine-functionalized anti-stripping agent evenly in said bitumen to form a modified bitumen composition having increased stripping resistance and enhanced adhesion to aggregates and substrates.

10. A method of making a modified bitumen as in claim 9 wherein said amine-functionalized anti-stripping agent is in solid form upon introduction to said bitumen.

11. A method of making a modified bitumen as in claim 10 wherein:
   a) said ammonium/natural polyphenolic-containing vegetable extract salt anti-stripping agent is present in an amount of from about 0.1% by weight to about 2% by weight in said bitumen.

12. A method of making a modified bitumen as in claim 9 wherein said amine-functionalized anti-stripping agent is solubilized in water prior to introduction to said bitumen.

13. A method of making a modified bitumen as in claim 12 wherein:
   a) said ammonium/natural polyphenolic-containing vegetable extract salt anti-stripping agent is present in an amount of from about 0.1% by dry weight to about 2% by dry weight in said bitumen.

14. A method of making a modified bitumen as in claim 9 which includes the additional steps of:
   a) adding a commercially available anti-stripping agent to said bitumen.

15. A method of making a modified bitumen as in claim 14 wherein:
   a) said ammonium/natural polyphenolic-containing vegetable extract salt anti-stripping agent is present in an amount of from about 0.1% by weight to about 2% by weight in said bitumen; and
   b) said commercially available anti-stripping agent is present in said bitumen in an amount from about 0.1% by weight of bitumen to about 2% by weight of bitumen.

16. A method of making modified bitumen as in claim 15 wherein said ammonium/natural polyphenolic-containing vegetable extract salt anti-stripping agent is solubilized in water.

17. A method of making a modified bitumen as in claim 9 wherein:
   a) said ammonium/natural polyphenolic-containing vegetable extract salt anti-stripping agent is present in an amount of from about 0.1% by weight to about 2% by weight in said bitumen.

18. A method of making a modified bitumen composition comprising in operative order the steps of:
   a) heating a bitumen to above about its softening point to lower its viscosity to permit mechanical mixing and agitation of the bitumen;
   b) adding a natural polyphenolic-containing vegetable extract (natural polyphenolic-containing vegetable extract) to said bitumen at the rate of from about 0.1 parts by dry weight to 25 parts by dry weight or more per 100 parts by weight of said bitumen;
   c) adding at least a stoichiometric amount of an ammonia containing compound directly into said bitumen to produce, in situ, an ammonium/natural polyphenolic-containing vegetable extract salt anti-stripping agent in an amount of at least 0.1% by weight of the bitumen; and
   d) mixing said ammonium/natural polyphenolic-containing vegetable extract salt anti-stripping agent with said bitumen to distribute said amine-functionalized anti-stripping agent evenly in said bitumen to form a modified bitumen composition having increased stripping resistance and enhanced adhesion to aggregates and substrates.

19. A method of making a modified bitumen as in claim 18 which includes the additional step of:
   a) adding a commercially available anti-stripping agent to said bitumen.

20. A method of making a modified bitumen as in claim 19 wherein:
   a) said ammonium/natural polyphenolic-containing vegetable extract salt anti-stripping agent is present in an amount of from about 0.1% by weight to about 2% by weight in said bitumen; and
   b) said commercially available anti-stripping agent is present in said bitumen in an amount from about 0.1% by weight of bitumen to about 2% by weight of bitumen.

21. A method of using a modified bitumen comprising in operative order the steps of:
   a) providing an ammonium/natural polyphenolic-containing vegetable extract salt anti-stripping-agent,
   b) adding said anti-stripping agent to a bitumen, said bitumen having predispersed therein, and prior to addition of the anti-stripping agent, a natural polyphenolic-containing vegetable extract in an amount ranging from about 0 parts to about 25 parts or more per 100 parts by weight of said bitumen, to form a modified bitumen;
   c) maintaining the viscosity of said modified bitumen low enough to be spreadable; and
   d) applying said modified bitumen to the surface or substrate to be treated.

22. A method of using a modified bitumen comprising in operative order the steps of:
   a) providing an ammonium/natural polyphenolic-containing vegetable extract anti-stripping-agent,
   b) adding said anti-stripping agent to a bitumen, said bitumen having predispersed therein, and prior to the addition of said anti-stripping agent, a natural polyphenolic-containing vegetable extract in an amount ranging from about 0 parts to about 25 parts or more per 100 parts by weight of said bitumen to form a modified bitumen;
   b) combining said modified bitumen with aggregate to produce a hot mix; and
   c) applying said hot mix to the road bed or substrate to be paved.

23. An ammonium/natural polyphenolic-containing vegetable extract salt anti-strippant pretreated aggregate comprising aggregate having coated thereon a layer of an amine-functionalized polyphenolic anti-strippant.

24. A method of pretreating aggregate with an ammonium/natural polyphenolic-containing vegetable extract salt anti-stripping agent comprising in operative order the steps of:
   a) dissolving a natural polyphenolic-containing vegetable extract in water to produce an aqueous natural polyphenolic-containing vegetable extract solution;
   b) adding at least a stoichiometric amount of an ammonia containing compound to said aqueous natural polyphenolic-containing vegetable extract solution;
   c) reacting said ammonia containing compound with said aqueous natural polyphenolic-containing vegetable extract solution to produce an aqueous ammonium/natural polyphenolic-containing vegetable extract salt anti-stripping solution;
   d) applying said aqueous ammonium/natural polyphenolic-containing vegetable extract salt anti-stripping solution directly to the aggregate so as to thoroughly wet all of the aggregate surface; and
   e) drying said wetted aggregate surfaces to produce an ammonium/natural polyphenolic-containing vegetable extract salt anti-stippant pretreated aggregate.

25. A method of pretreating a roadbed with an ammonium/natural polyphenolic-containing vegetable extract salt anti-stripping agent comprising in operative order the steps of:
   a) dissolving a natural polyphenolic vegetable extract in water to produce an aqueous natural polyphenolic-containing vegetable extract solution;
   b) adding at least a stoichiometric amount of an ammonia containing compound to said aqueous natural polyphenolic-containing vegetable extract solution;

c) reacting said ammonia containing compound with said aqueous natural polyphenolic-containing vegetable extract solution to produce an aqueous ammonium/natural polyphenolic-containing vegetable extract salt anti-stripping solution;

d) applying said aqueous ammonium/natural polyphenolic-containing vegetable extract salt anti-stripping solution directly to a roadbed so as to thoroughly wet all of the roadbed surface; and e) drying said wetted roadbed surfaces to produce an ammonium/natural polyphenolic-containing vegetable extract salt anti-strippant pretreated roadbed surface.

* * * * *